United States Patent Office 2,741,703
Patented Apr. 10, 1956

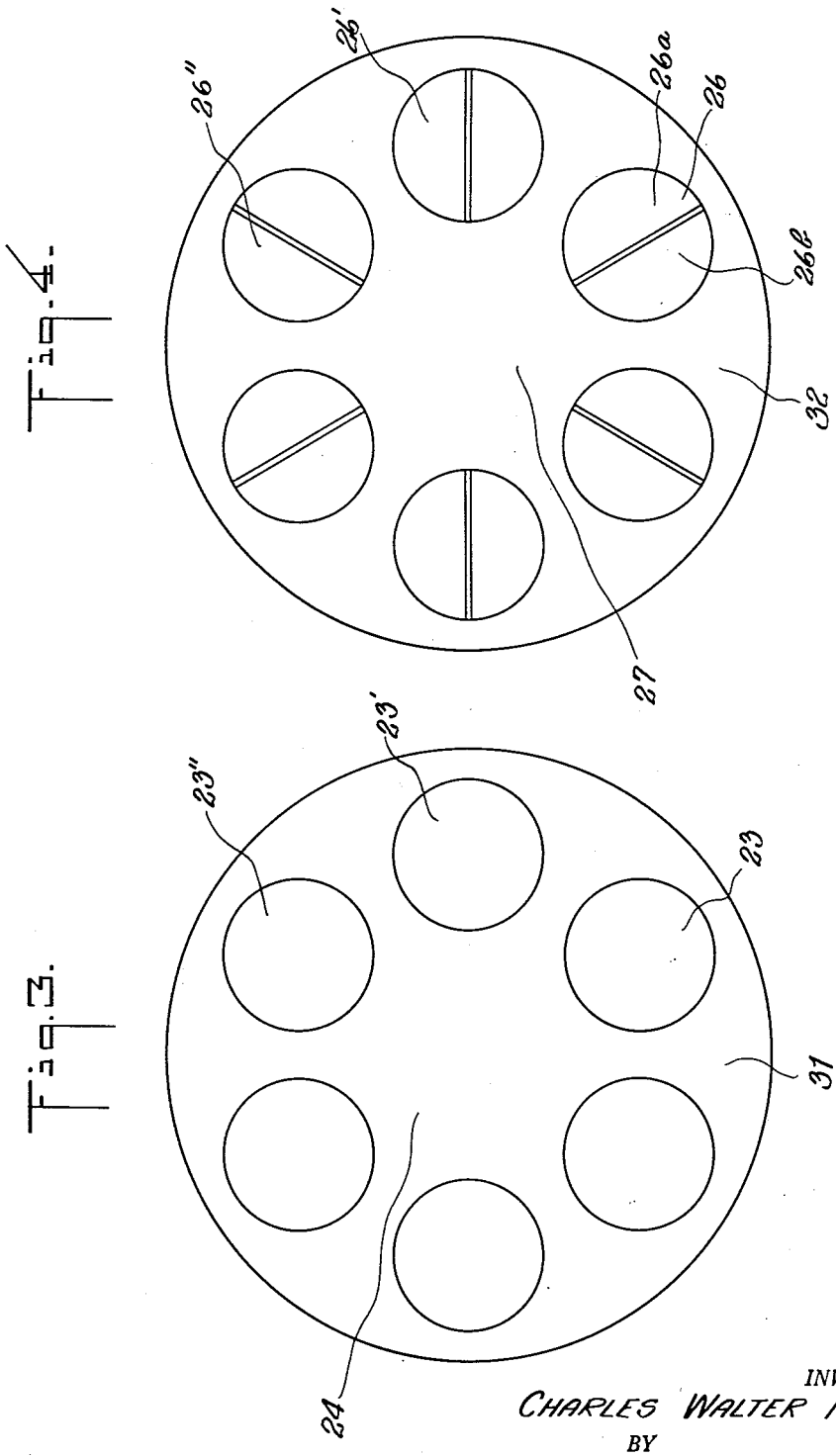

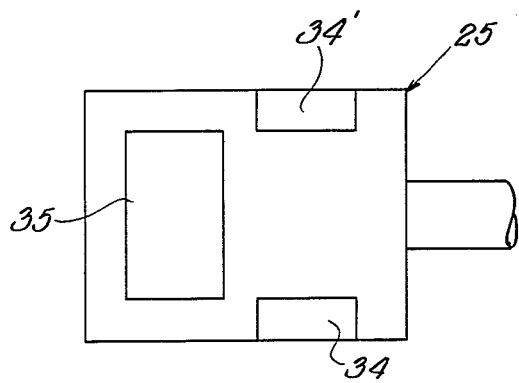
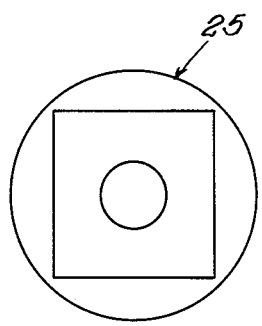
Fig. 5.  Fig. 6.
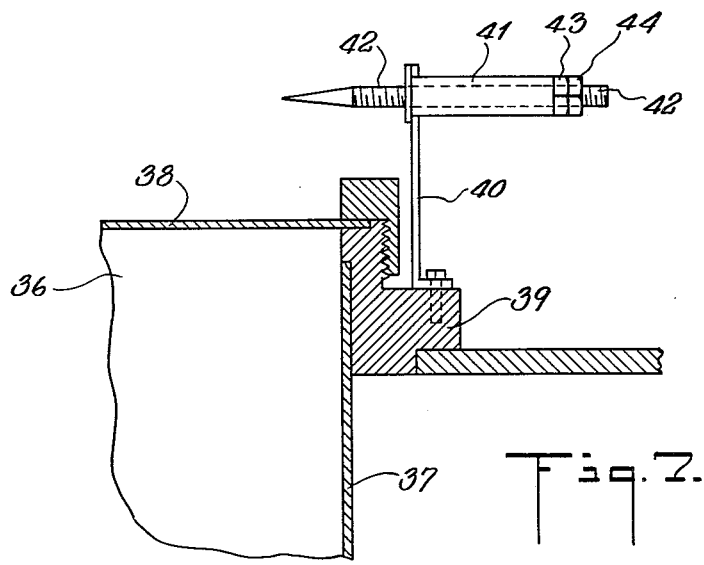
Fig. 7.

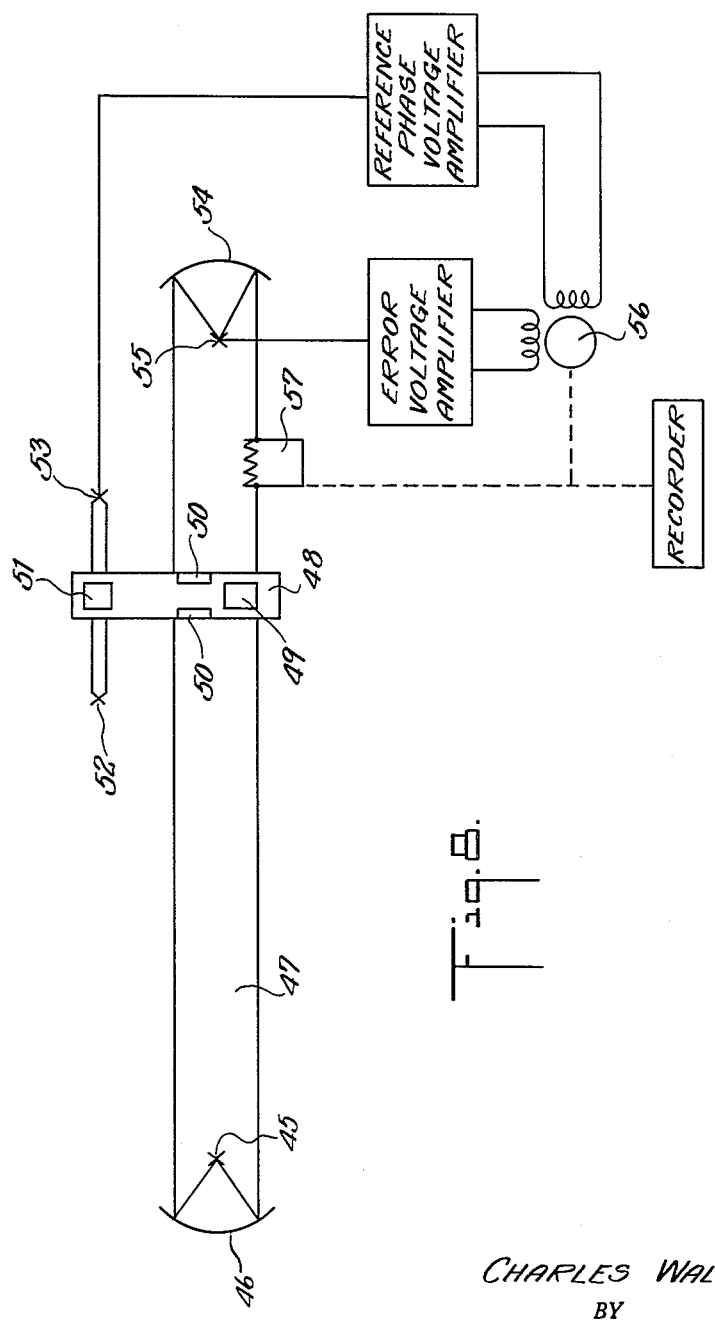

2,741,703

MULTICOMPONENT RADIATION GAS ANALYSERS

Charles Walter Munday, London, England, assignor to The Distillers Company Limited, Edinburgh, Scotland, a British company Application August 5, 1950, Serial No. 177,890

Claims priority, application Great Britain August 13, 1949

21 Claims. (Cl. 250—43.5)

The present invention relates to an improved construction for an apparatus suitable for the analysis by radiation absorption, and preferably infra-red radiation absorption, of gases comprising more than one component.

Various types of instruments for the infra-red absorption analysis of gas mixtures are known in the art, and the principle of these instruments depends on the fact that when a beam of infra-red radiation is passed through a mixture of gases, one of the components of which has an absorption band in the infra-red, the energy absorbed is proportional to the number of molecules present of the absorbing component, and thus when beams of infra-red radiation are passed through two gas cells, wherein one of the gas cells contains the gas mixture to be analysed and the other gas cell contains a reference gas free from the absorbing component, there will be a difference in the energy content of the beams, which if determined will be a measure of the absorbing component of the gas mixture. One of the best known of the infra-red absorption analysis instruments is the U. R. A. S. analyser which employs a selective detector. In this instrument a beam of pulsating infra-red radiation is passed through an absorption cell containing the gas to be analysed, and then into one side of a detector chamber containing the absorbing component of the gas mixture. A beam of pulsating infra-red radiation is passed through a comparison absorption cell comprising a gold plated glass tube containing a standard gas, and then into the other side of the detector chamber containing the absorbing component of the gas mixture. The two halves of the detector chamber are separated by the diaphragm of a membrane condenser. The absorption of energy only in the absorption cell causes differential heating of the two sides of the detector chamber and this results in a difference in pressure between the gases in the two halves of the chamber. This pressure difference across the diaphragm of the membrane condenser causes a small potential difference to be set up which can be used as a measure of the degree of absorption by the absorbing component of the gas being analysed and therefore of its concentration. The standard gas is a non-absorber in the infra-red such as $O_2$, $N_2$, air or any other homonuclear diatomic gas.

This apparatus is fully described in B. I. O. S. Final Report No. 1321, pages 67–69, and F. I. A. T. Final Report No. 523 and 586, pages 90–111.

Another type of apparatus for infra-red absorption analysis of gas mixtures is known as the "split beam analyser," which employs a non-selective detector. In this type of analyser a beam of infra-red radiation, is passed through one or more cells containing the requisite gas mixtures, the beam of radiation is split at a suitable point into two equal beams, and the two beams are focussed on one or two sensitive recorders. Such split beam analysers are described by Kivenson in the Journal of the Optical Society of America, February 1950, volume 40, Number 2, pages 112–118.

A similar type of apparatus can be used for the ultraviolet absorption analysis of gases, employing a suitable source of ultra-violet radiation and suitable windows for the gas chambers and detectors for ultra-violet radiation, for example as described by Kivenson, Osman and Jones in Analytical Chemistry 1949, vol. 21, 769.

Such radiation gas analysers have only been used in the past for the analysis of a gas mixture with respect to one component only of the gas mixture. The accurate determination of this component is dependent on the absence of secondary absorption by another component of the gas mixture. Where the gas mixture contains two or more components which absorb radiation in the same wavelength range, the apparatus has been successfully employed to determine one of these components by inserting in the path of the radiation a filter chamber containing the components of the gas mixture other than the component to be analysed. Thus, for example, in the analysis of the ethylene content of a gas mixture comprising acetylene, ethylene and methane, by the insertion of a filter cell containing acetylene and methane in the radiation beam, the overlapping radiation can be removed and accurate determination of the ethylene content obtained.

Where it is desired to determine the amounts and concentrations of two or more components of a gas mixture by this method, it has been necessary in the past to employ a separate apparatus for the determination of each component.

It is an object of the present invention to provide an improved instrument which can be used to determine the amounts and concentrations of two or more components of a gas mixture. The invention accordingly comprises the novel apparatus and combinations thereof, specific embodiments of which are described hereinafter by way of example only and in accordance with which I now prefer to practise the invention.

The present invention is for a radiation gas analyser wherein two beams of radiation are employed, which is characterized in that at least one filter unit is provided consisting of a support which is preferably rotatable about an axis substantially parallel to the beams of radiation, the support containing longitudinally therein at least two filter cells, and means are provided to rotate said filter unit to bring each filter cell alternately into position directly in line in said beams of radiation.

The filter unit preferably comprises a cylindrical support, which is rotatable about an axis parallel to the absorption cells of the apparatus, this cylindrical support being provided with longitudinal holes about the periphery, in which are fitted filter cells. The filter unit and filter cells may be constructed so that the two beams of radiation pass through a single filter cell or alternatively a separate filter unit may be provided for each discrete beam of radiation. The filter units are rotated by a suitable mechanism such that a filter cell in the support can be rotated into position directly in line in the radiation beam, remain in this position for a fixed period of time, and thereafter the adjacent filter cell being rotated into the postion directly in line in the radiation beam.

Modifications of the present invention are shown diagrammatically in the accompanying drawings, solely by way of illustration.

Figure 3 is a cross-section of drum unit 24.

Figure 4 is a cross-section of drum unit 27.

Figure 5 is a side elevation of the interrupter 25.

Figure 6 is a cross-section of interrupter 25.

Figure 7 is a cross-section of a filter cell showing a balancing shutter, and

Figure 8 is a block diagram of the "on balance" arrangement.

Figure 1:
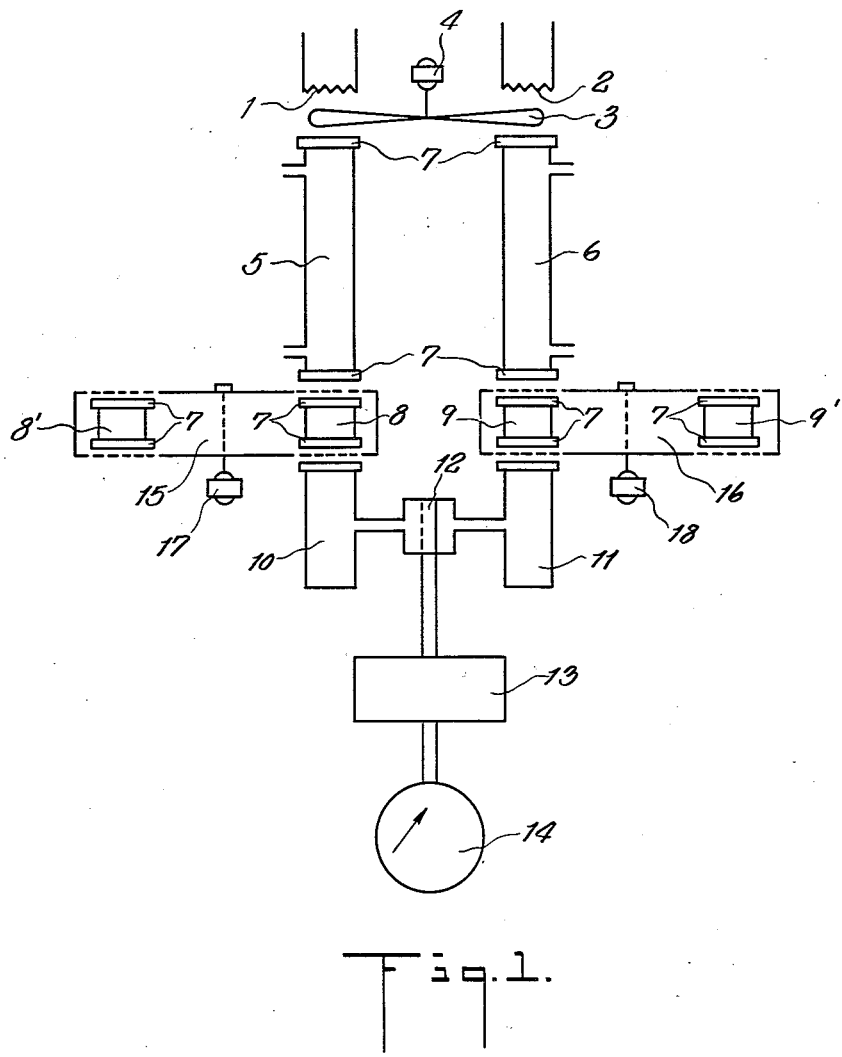
Figure 1 is a diagrammatic layout plan of an infra-red gas analyser using a selective detector.

In Figure 1 the infra-red sources 1 and 2 supply beams of radiation, interrupted by the rotating vane 3 driven by the synchronous motor 4, and these beams of radiation pass through the analysis gas absorption cells 5 and 6, provided with rock salt windows 7, and thence through the filter cells 8 and 9 into the condenser detector which comprises the receiving chambers 10 and 11 also provided with rock salt windows and separated by the membrane condenser 12. Any potential difference across this condenser is amplified by the amplifier 13 and recorded on the meter 14.

The filter or drum units 15 and 16 containing the filter cells 8, $8^1$ etc. and 9, $9^1$ etc., are driven by the synchronous motors 17 and 18 respectively, which may be either electrically or mechanically coupled, these motors being such that the drum units are rotated discontinuously, in order that each filter cell is rotated into position into line below the absorption cell, allowed to rest in this position for a suitable period of time, and then the adjacent filter cell rotated into position below the absorption cell. The positioning of a filter cell in one drum unit is synchronised with the positioning of a corresponding filter cell in the other drum unit. The parts of the drum units between the filter cells need to be shielded to interrupt the beams of radiation when the filter cells are not in position.

In the operation of the apparatus of Figure 1 for the analysis of six components A, B, C, D, E and F, both sides 10 and 11 of the receiving chamber are filled with a mixture of A, B, C, D, E and F, the optimum concentration of each component being determined by experiment as in the case with the standard instrument. The drum units employed each containing a set of six filter cells and the six filter cells in each drum are each filled with a different combination of five of the components of the gas mixture, the six gas mixtures comprising: (1) B, C, D, E, F; (2) A, C, D, E, F; (3) A, B, D, E, F; (4) A, B, C, E, F; (5) A, B, C, D, F; (6) A, B, C, D, E. These filter cells are so arranged in the drum units that when a filter cell in drum 15 is in position under the absorption cell, the corresponding filter cell in drum 16 also in position under the other absorption cell contains the same combination of 5 of the components of the gas mixture.

In the operation of the apparatus the pair of cells in each drum unit are rotated into position below the absorption cell for a sufficient time for the system to come to equilibrium and a reading to be made, and then their place is taken by the adjacent pair of cells.

The gas mixture containing the six components is passed through the absorption cell 5, and air is contained or passed through the reference absorption cell 6.

When the pair of filter cells containing components B, C, D, E, F, are in position, the wavelengths corresponding to the absorption bands B, C, D, E, F, are wholly absorbed in the filter cell, and any variation in the concentration of these five components in the absorption cell 5 will not have any effect on the reading obtained, which will be a measure solely of the concentration of component A in the gas mixture. In this way each component of the mixture may be determined in turn. To facilitate determining which component each reading obtained coresponds to, a number indicator is suitably incorporated in the dial of the recorder, said indicator being driven by means synchronised with the movement of the drum units.

Figure 2:
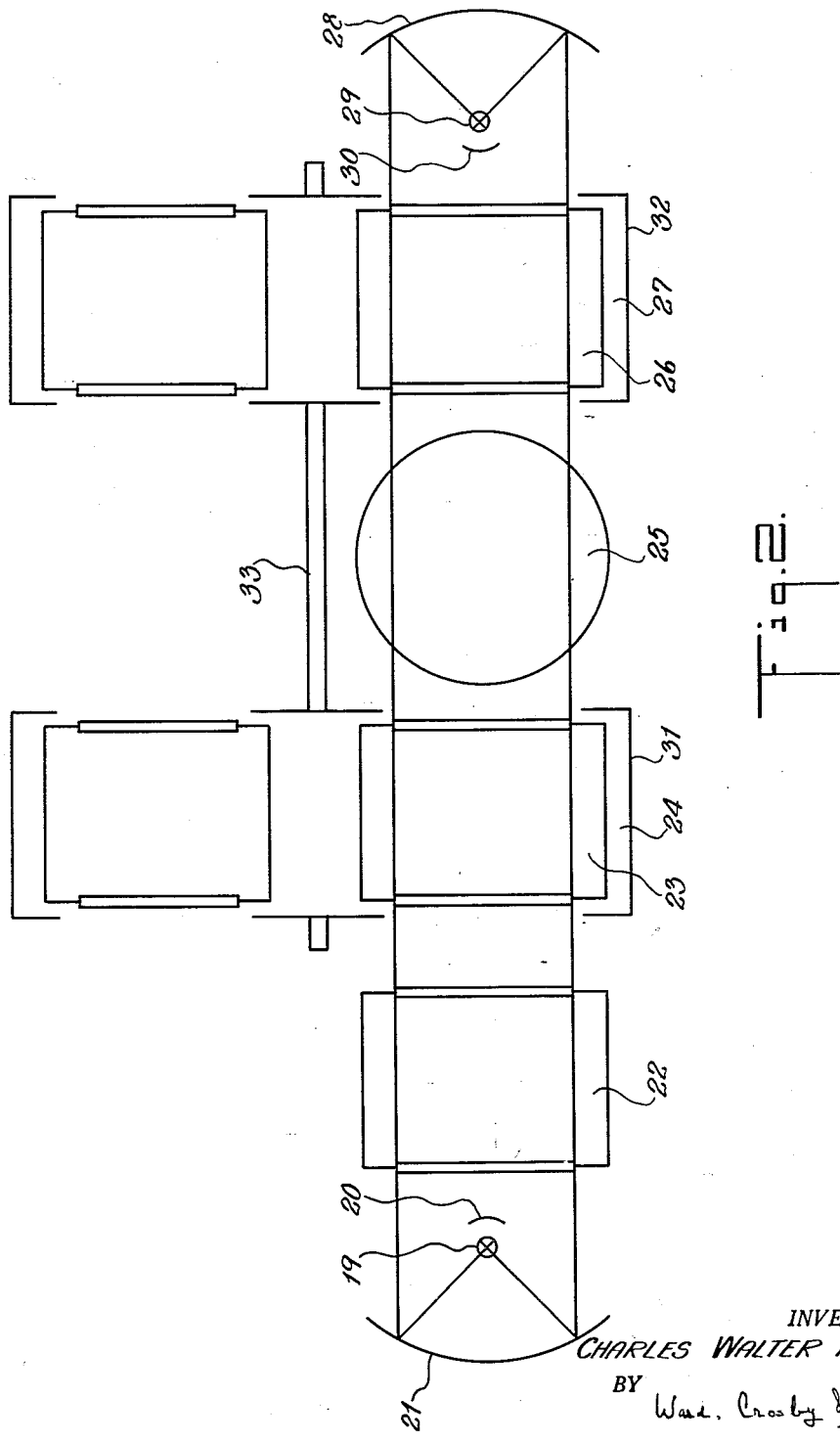
Figure 2 is a diagrammatic layout plan of an infra-red gas analyser using a non-selective detector.

In Figure 2 a source of infra-red radiation 19 protected by screen 20 is reflected by the concave mirror 21 to give a beam of radiation. This beam of radiation passes into the analysis gas absorption cell 22 containing the gas mixture to be analysed and then through the filter cell 23 contained in the drum unit 24. The beam of radiation is divided into two equal alternately interrupted beams of radition by the rotating interrupter 25, one of said beams passing through one-half cell "a" of the test gas absorption/standard gas absorption double cell 26 contained in the drum unit 27 and is then concentrated by the mirror 28 onto the radiation detector 29 protected by a screen 30, the other of said beams passing the other half cell "b" of the absorption/standard gas absorption double cell 26 and is then concentrated by the mirror 28 onto the radiation detector 29.

The drum unit 2, 4 is shown in cross-section in Figure 3, and consists of a cylindrical support 31 containing filter cells 23, $23^1$, etc. disposed in the periphery thereof.

The drum unit 27 is shown in cross-section in Figure 4, and consists of a cylindrical support 32 containing double cells 26, $26^1$ etc. The two drum units are mounted rigidly with respect to one another on a common shaft 33, and are provided with frictional drive means (not shown) operating against the side of one of the drum units. The parts of the drum units between the cells need to be shielded to interrupt the beams of radiation when the filter cells are not in position.

The interrupter 25 is shown in side elevation in Figure 5 and in cross-section in Figure 6, and comprises a cylinder provided with two pairs of apertures 34, $34^1$ and 35, $35^1$.

The apparatus requires to be set up in optical alignment for the satisfactory operation of the apparatus.

The drum units 24 and 27 are rotated discontinuously in order that each filter cell in drum unit 24 is rotated into position in line in the radiation beam, allowed to rest in this position for a suitable period of time, and then the adjacent filter cell rotated into that position, and simultaneously each test gas absorption/standard gas absorption double cell is rotated similarly into position in the radiation beam, the drum unit and the interrupter 25 being aligned so that one interrupted beam passes only through one half cell of said double cell whilst the other and equal interrupted beam passes only through the other half cell of said double cell.

In the operation of the apparatus according to Figure 2 for the analysis of a gas containing six components A, B, C, D, E and F, the gas mixture containing six components is passed through the analysis gas absorption cell 22. The drum unit employed contains a set of six filter cells and six test gas absorption/standard gas or divided gas absorption cells, each filter cell being paired with one of said divided cells. The cells are mounted and aligned so that the two beams of infra-red radiation pass through the filter cell and then one of said beams passes through one compartment of the divided cell, whilst the other beam passes through the other compartment of the divided cell. Each filter cell is filled with a different combination of five of the components, and one compartment of the divided cell associated with each filter cell is filled with the missing sixth component of the gas mixture—the test gas absorption half cell—and the other compartment of said divided cell is filled with a standard gas such as oxygen—the standard gas absorption half cell. The six gas mixtures filled into the filter cells comprise (1) B, C, D, E, F; (2) A, C, D, E, F; (3) A, B, D, E, F; (4) A, B, C, E, F; (5) A, B, C, D, F; (6) A, B, C, D, E, and the test gas absorption half cell associated with each mixture is filled with (1) A, (2) B, (3) C, (4) D, (5) E, (6) F, respectively, and in each case the reading obtained will be a measure of the content of the gas present in the test gas absorption half cell of the gas mixture. Thus, referring to the drawing where the filter cell 23 contains a mixture A, B, C, D, E, and the test gas absorption half cell 26a contains F and the standard gas absorption half cell 26b contains oxygen, with the instrument aligned, the reading obtained gives a measure of the content of F in the gas mixture tested. In this way each component of the mixture may be determined in turn.

In the types of infra-red gas analysers illustrated, the relative position of the various parts of the apparatus is of no significance. It is of course essential that the absorption cells and each pair of filter cells are provided with some balancing means, such as a metal shutter, to ensure that they can be adjusted to have equal absorption characteristics prior to being employed for analysis, as in other types of infra-red absorption anaylsis instruments.

In Figure 7 is shown, in cross-section, an incomplete filter cell provided with a balancing shutter. The filter cell 36, with cell wall 37, and window 38 is shown attached to the collar 39 which is part of a drum or filter unit as described above. The collar 39 carries the bar 40 which rigidly supports the shutter carriage 41. The shutter 42 comprises a rod, tapering at one end, and threaded, the carriage 41 being also screw threaded throughout its length to receive the threaded portion of said rod. The shutter can be simply screwed in whatever position is desired, and locked in that position by the locking nuts 43 and 44.

Although the apparatus according to the present invention has been described above with reference to infra-red gas analysers, the drum units according to the present invention may be used similarly in other types of radiation gas analysers, such as ultra-violet gas analysers.

The drum units may be provided with as many filter cells as is required, but in general the number of filter cells employed will correspond to the number of components of which it is required to determine the concentration, contained in the gas mixture to be analysed.

It should be noted that the drum unit containing more filter cells than it is required to use can be employed, merely by blocking out the filter cells which are not required.

The apparatus according to the present invention is of particular application for the analysis of multi-component gases, where two or more of the components of the gas absorb radiation at substantially the same wave length ranges.

The apparatus according to the present invention can be employed for the analysis of any gas mixture, provided that the components of the gas mixture are not such that the filter cell will filter out radiation of wavelengths corresponding to every absorption band in the component being measured.

In the infra-red analysis of gas mixtures, for example hydrocarbon gas mixtures, with similar infra-red absorption spectra in the $3\mu$ region, in which the major part of the radiant energy is concentrated, the discrimination of the analysis can be improved by the insertion of a suitable filter to remove the $3\mu$ band, thus ensuring the full use of the differences in the infra-red absorption spectra in the longer wavelength regions.

The infra-red gas analyser may be used as an "off balance" instrument, that is the voltage generated at the detector unit used directly for indicating purposes, or alternatively the apparatus may be used as an "on balance" instrument, that is associated with a servo-type mechanism, for example where the generated voltage is used to operate means to drive a wedge or a comb into one of the beams of radiation to maintain the instrument on balance, the energy used by said driving means being employed to activate the indicating means.

Thus for example, associated with the apparatus shown in Figure 2, a comb may be driven by a phase discriminating motor into the radiation beam which has passed through the standard gas absorption cell, the phase discriminating motor being responsive to the difference between, on the one hand, the phase of the amplified voltage generated at the detector and, on the other hand, the phase of the amplified voltage generated at a detector from an independent light source interrupted by means of a suitably placed additional pair of apertures provided in the cylindrical interrupter 25. By way of illustration, in Figure 8 is shown a block diagram of such an arrangement, which may be associated for example with the apparatus shown in Figure 2. The block diagram shows the radiation source 45 reflected by concave mirror 46 to give a parallel beam of radiation 47. The absorption and filter cells are not shown in the diagram, and the beam is split and interrupted by the interrupter 48 through the two pairs of apertures 49 and 50. A third pair of apertures 51 in the interrupter 48 serves to interrupt a beam of light from light source 52, received by the photocell 53 which provides the reference phase voltage. The beam of radiation 47 is concentrated by the concave mirror 54 onto the radiation detector 55. The error voltage from the radiation detector 55, and the reference phase voltage are both amplified and actuate the phase discriminating motor 56, which is mechanically coupled to the comb 57, which is driven in and out of the radiation beam 47, and to the recorder.

I claim:

1. A radiation fluid analyser comprising means for producing two beams of radiation, a detector for said radiation mounted in the path of said beams, an analysis cell adapted to receive a fluid to be analysed mounted in the path of at least one of said beams between said means and said detector, and a filter unit comprising a plurality of filter cells, each of said cells containing a plurality of components of said fluid, and one of said components being omitted from one of said cells, and means for moving each filter cell alternately into position in the path of at least one of said beams between said producing means and said detector.

2. A radiation fluid analyser comprising means for producing two beams of radiation, a detector for said radiation mounted in the path of said beams, an analysis cell adapted to receive a fluid to be analysed mounted in the path of at least one of said beams between said means and said detector, and a filter unit comprising a rotatable support and a plurality of filter cells circularly mounted on said support, each of said cells containing a plurality of components of said fluid, and one of said components being omitted from one of said cells and said unit being mounted with one of said cells in the path of at least one of said means between said producing means and said detector.

3. A radiation fluid analyser in accordance with claim 2 wherein the axis of said rotatable support is parallel to the path of at least one of said beams.

4. A radiation fluid analyser comprising means for producing two beams of radiation, a detector for said radiation mounted in the path of said beams, an analysis cell adapted to receive a fluid to be analysed mounted in the path of at least one of said beams between said means and said detector, a standard fluid absorption cell mounted in the path of the other of said beams between said means and said detector, and a filter system comprising a plurality of filters, each of said filters containing a plurality of components of said fluid, and one of said components being omitted from one of said cells, and means for moving said filters successively into position in the path of said beams between said producing means and said detector.

5. A radiation fluid analyser comprising means for producing two beams of radiation, a detector for said radiation mounted in the path of said beams, an analysis cell adapted to receive a fluid to be analysed mounted in the path of at least one of said beams between said means and said detector, a first filter unit comprising a plurality of filter cells, each of said cells being adapted to filter a different portion of said radiation, a second filter unit comprising a plurality of filter cells, each of said last-mentioned cells being adapted to contain a fluid, and means for moving said filter cells of said first filter unit successively into position in the path of at least one of said beams between said producing means and said detector and for moving said filter cells of said second filter unit successively into position in the path of the other of said beams between said producing means and said detector.

6. An infra-red radiation gas analyser which comprises a source of two substantially equal beams of pulsating infra-red radiation, an analysis gas absorption cell, a standard gas absorption cell, at least one filter unit comprising a support, containing longitudinally therein at least two filter cells, each of said cells containing gas and being adapted to filter a first portion of said radiation and to transmit a second portion thereof, the portion of said radiation transmitted by each cell being different from the portions transmitted by the other cells, a detector including two gas chambers connected to an indicator responsive to infra-red absorption therein, means for passing one beam of infra-red radiation through said analysis gas absorption cell, a filter cell of said unit and then into one of the gas chambers of said detector and means for simultaneously passing the other beam of infra-red radiation through said standard gas absorption cell, said filter cell and then into the other gas chamber of said detector, and means for the rotation of the filter cells of said unit alternately into position in said beams of infra-red radiation.

7. An infra-red radiation gas analyser which comprises a source of two substantially equal beams of pulsating infra-red radiation, an analysis gas absorption cell, a standard gas absorption cell, two filter units each consisting of a support containing longitudinally therein at least two filter cells, each of said cells being adapted to filter a different portion of said radiation, a detector including two gas chambers connected to an indicator responsive to infra-red absorption therein, means for passing one beam of infra-red radiation through said analysis gas absorption cell, a filter cell in one of said filter units and then into one of the gas chambers of said detector and means for simultaneously passing the other beam of infra-red radiation through said standard gas absorption cell, a filter cell in the other of said filter units and then into the other gas chamber of said detector and means for the discontinuous rotation of said filter units to rotate each filter cell in each filter unit into position in said beam of infra-red radiation associated therewith.

8. An infra-red radiation gas analyser as claimed in claim 7, wherein the two gas chambers of the detector joined through a membrane condenser and the indicating means are actuated by the potential difference generated across the membrane condenser.

9. An infra-red radiation gas analyser as claimed in claim 7, wherein the two beams of infra-red radiation are substantially parallel to one another, and the axis of rotation of the filter unit is substantially parallel thereto.

10. A radiation gas analyser which comprises a source of radiation, an analysis gas absorption cell, a filter unit consisting of a support containing longitudinally therein at least two filter cells, a second filter unit containing an equal number of divided gas absorption cells which each comprise an absorption cell arranged in two gas tight compartments, a radiation detector, means for dividing the radiation into two equal discrete beams of radiation, means for passing one beam of radiation through said analysis gas absorption cell, a filter cell and one compartment of a divided gas absorption cell, means for passing the other beam of radiation through said analysis gas absorption cell, said filter cell and the other compartment of said divided gas absorption cell, means for the alternate interruption of the discrete beams of radiation, means for the concentration of said beams of radiation onto a single radiation detector, and means for the discontinuous rotation of said filter units to rotate each filter cell and each divided gas absorption cell into position in said beams of radiation.

11. A radiation gas analyser which comprises a source of radiation, an analysis gas absorption cell, a filter unit consisting of a support, longitudinally therein at least two filter cells, a second filter unit containing equal number of divided gas absorption cells which each comprise an absorption cell, two radiation detectors, means for dividing the radiation into two equal beams of radiation, means for passing one beam of radiation through said analysis gas absorption cell, a filter cell, and one compartment of said divided gas absorption cell, and then onto one of said radiation detectors, means for passing the other beam of radiation through said analysis gas absorption cell, a filter cell, and the other compartment of said divided gas absorption cell and then onto the other of said radiation detectors, and means for the discontinuous rotation of said filter units to rotate each filter cell and each divided gas absorption cell into position in said beams of radiation.

12. A radiation gas analyser as claimed in claim 10, wherein the filter unit containing the filter cells and the filter unit containing the divided gas absorption cells are coupled mechanically.

13. A radiation gas analyser as claimed in claim 11, wherein the filter unit containing the filter cells and the filter unit containing the divided gas absorption cells are mechanically coupled.

14. A radiation gas analyser as claimed in claim 10, wherein one filter unit contains six filter cells and the other filter unit contains six divided gas absorption cells.

15. A radiation gas analyser as claimed in claim 11, wherein one filter unit contains six filter cells and the other filter unit contains six divided gas absorption cells.

16. A radiation gas analyser as claimed in claim 10, which employs infra-red radiation.

17. A radiation gas analyser as claimed in claim 11, which employs infra-red radiation.

18. An infra-red gas analyser comprising in combination a source of two beams of infra-red radiation, two absorption cells, two filter units each containing at least two filters, each of said filters being adapted to filter a first portion of said radiation and to transmit a second portion thereof, the portion of said radiation transmitted by each filter being different from the portions transmitted by the other filters and a detector having two compartments separated by a membrane condenser, the source of said beam being positioned to pass a beam through one of each of said cells, said units and said compartments, means for moving each of said filters successively into position in its respective radiation beam, and indicating means actuated by the potential differences generated across said membrane condenser.

19. A radiation gas analyser comprising means for producing two beams of radiation, a detector for said radiation mounted in the path of said beams, an analysis cell adapted to receive a gas to be analysed mounted in the path of both said beams between said means and said detector, a first filter unit comprising a plurality of filter cells, each of said cells being adapted to filter a first portion of said radiation and to transmit a second portion thereof, the portion of said radiation transmitted by each cell being different from the portions transmitted by the other cells, a second filter unit comprising a plurality of filter cells corresponding in number to the number of cells in said first filter unit, each of said last-mentioned cells being adapted to filter a portion of said radiation which is the same as one of the second portions of said radiation transmitted by said cells of said first filter unit, means for moving each filter cell of said first filter unit into position in the path of both said beams between said producing means and said detector and for moving at the same time the filter cell of said second filter unit which filters the portion of the radiation transmitted by the cell of the first filter unit in said path into position in the path of one of said beams between said producing means and said detector and a standard gas cell mounted in the path of the other of said beams between said producing means and said detector.

20. A radiation gas analyser comprising means for producing two beams of radiation, a detector for said radiation mounted in the path of said beams, an analysis cell adapted to receive a gas to be analysed mounted in the path of both said beams between said means and said detector, a first filter unit comprising a plurality of filter cells, each of said cells being adapted to filter a different portion of said radiation, a second filter unit comprising a plurality of filter cells, each of said last-mentioned cells being adapted to filter a different portion of said radiation, means for moving said filter cells of said first filter unit successively into position in the path of both said beams between said producing means and said detector and for moving said filter cells of said second filter unit successively into position in the path of one of said beams between said producing means and said detector, a standard gas cell mounted in the path of the other of said beams between said producing means and said detector, means for alternately interrupting said beams, means for generating a reference signal and means connected to said detector and to said generating means and responsive to the outputs thereof.

21. In a photometric analyzer, in combination, a radiation source, a radiation detector, reflecting means to form a pair of radiation beams extending from said source to said detector, a pair of cells disposed in each beam, said cells being adapted to hold a fluid substance preferentially absorbing certain wave lengths of said radiation beams, means for moving said cells into and out of said beams, said means for moving said cells comprising means for discontinuing said movement each time a pair of corresponding cells are in position to permit passage therethrough of said radiation beams, and a fixed cell disposed in both beams of radiation, said fixed cell being adapted to contain a fluid sample to be analyzed.

References Cited in the file of this patent

UNITED STATES PATENTS

| | | |
|---|---|---|
| 2,152,645 | Holven et al. | Apr. 4, 1939 |
| 2,339,053 | Coleman | Jan. 11, 1944 |
| 2,386,878 | Nickerson | Oct. 16, 1945 |
| 2,496,333 | Cary et al. | Feb. 7, 1950 |
| 2,534,657 | Bray | Dec. 19, 1950 |
| 2,545,162 | Muly et al. | Mar. 13, 1951 |
| 2,570,064 | Meinert | Oct. 2, 1951 |
| 2,601,182 | Tyler | June 17, 1952 |
| 2,612,608 | Miller | Sept. 30, 1952 |
| 2,668,243 | Williams | Feb. 2, 1954 |